United States Patent
Schweitzer

(10) Patent No.: US 6,931,444 B2
(45) Date of Patent: Aug. 16, 2005

(54) SYSTEM, METHOD AND COMPUTER PROGRAM PRODUCT FOR READING, CORRELATING, PROCESSING, CATEGORIZING AND AGGREGATING EVENTS OF ANY TYPE

(75) Inventor: Limor Schweitzer, Santa Clara, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 806 days.

(21) Appl. No.: 09/865,909

(22) Filed: May 24, 2001

(65) Prior Publication Data

US 2002/0038364 A1 Mar. 28, 2002

Related U.S. Application Data

(60) Provisional application No. 60/211,029, filed on Jun. 12, 2000.

(51) Int. Cl.[7] .............................................. G06F 15/173
(52) U.S. Cl. ................ 709/224; 709/223; 709/230; 709/241; 709/242; 709/243; 705/34
(58) Field of Search ................ 709/223, 224, 709/230, 241, 242, 243; 707/1, 10, 101; 705/34; 703/27; 713/201; 700/90; 370/389, 394; 379/114.04

(56) References Cited

U.S. PATENT DOCUMENTS

| | | | | |
|---|---|---|---|---|
| 5,101,402 A | * | 3/1992 | Chiu et al. ................... | 709/224 |
| 5,151,899 A | * | 9/1992 | Thomas et al. .............. | 370/394 |
| 5,500,855 A | | 3/1996 | Hershey et al. .............. | 370/17 |
| 5,509,123 A | * | 4/1996 | Dobbins et al. ............. | 709/243 |
| 5,615,351 A | * | 3/1997 | Loeb ............................ | 700/90 |
| 5,778,350 A | * | 7/1998 | Adams et al. ................ | 707/1 |
| 5,781,729 A | * | 7/1998 | Baker et al. ................. | 709/230 |
| 5,796,942 A | * | 8/1998 | Esbensen ..................... | 713/201 |
| 5,856,972 A | * | 1/1999 | Riley et al. .................. | 370/389 |
| 5,878,420 A | * | 3/1999 | de la Salle .................. | 707/10 |
| 5,893,077 A | | 4/1999 | Griffin ......................... | 705/34 |
| 5,958,010 A | * | 9/1999 | Agarwal et al. ............. | 709/224 |
| 5,964,841 A | * | 10/1999 | Rekhter ....................... | 709/242 |
| 6,016,340 A | * | 1/2000 | Bayraktar .................... | 379/114.04 |
| 6,032,147 A | * | 2/2000 | Williams et al. ............ | 707/101 |
| 6,119,109 A | | 9/2000 | Muratani et al. ............ | 705/400 |
| 6,175,867 B1 | * | 1/2001 | Taghadoss ................... | 709/223 |
| 6,208,977 B1 | * | 3/2001 | Hernandez et al. .......... | 705/34 |
| 6,243,667 B1 | * | 6/2001 | Kerr et al. ................... | 703/27 |
| 6,260,072 B1 | * | 7/2001 | Rodriguez-Moral ........ | 709/241 |
| 6,308,148 B1 | * | 10/2001 | Bruins et al. ................ | 703/27 |

FOREIGN PATENT DOCUMENTS

WO    99/27556    6/1999    ............ H01J/17/30

* cited by examiner

Primary Examiner—Jack B. Harvey
Assistant Examiner—Hai V. Nguyen
(74) Attorney, Agent, or Firm—Zilka-Kotab, PC

(57) ABSTRACT

A system, method and computer program product are provided for handling network accounting information. Initially, records indicative of network events are received from an input source. Next, action events are selected based on the input source. Such selected action events are then executed on the records for reading, correlating, processing, categorizing, and/or aggregating network accounting information associated with the records.

19 Claims, 7 Drawing Sheets

| Operator Type | Compare | | Greater | | Lower | | Notes |
|---|---|---|---|---|---|---|---|
| | == | != | > | >= | < | <= | |
| Boolean | ✓ | ✓ | ✗ | ✗ | ✗ | ✗ | |
| Int | ✓ | ✓ | ✓ | ✓ | ✓ | ✓ | |
| Uint | ✓ | ✓ | ✓ | ✓ | ✓ | ✓ | |
| Long | ✓ | ✓ | ✓ | ✓ | ✓ | ✓ | |
| Ulong | ✓ | ✓ | ✓ | ✓ | ✓ | ✓ | |
| String | ✓ | ✓ | ✓ | ✓ | ✗ | ✗ | The Greate/Lower comerators are lexical |
| Float | ✓ | ✓ | ✓ | ✓ | ✓ | ✓ | |
| Double | ✓ | ✓ | ✓ | ✓ | ✓ | ✓ | |
| IPv4 | ✓ | ✓ | ✗ | ✗ | ✗ | ✗ | |
| IPv4Net | ✓ | ✓ | ✗ | ✗ | ✗ | ✗ | An IPv4Net is always compared to an IPv4 (i.e.: is the ip in the given range...) |
| IPv4Range | ✓ | ✓ | ✗ | ✗ | ✗ | ✗ | An IPv4Range is always compared to an IPv4 (i.e.: is the ip in the given range...) |
| Time | ✓ | ✓ | ✓ | ✓ | ✓ | ✓ | |
| TimeRange | ✓ | ✓ | ✗ | ✗ | ✗ | ✗ | A Timeange is always compared to a Time (i.e.: is the ip in the given range...) |

| Operator Type | And | | Or | | Xor | | Negate |
|---|---|---|---|---|---|---|---|
| | & | &= | \| | \|= | ^ | ^= | ~ |
| Boolean | ✔ | ✔ | ✔ | ✔ | ✔ | ✔ | ✔ |
| Int | ✔ | ✔ | ✔ | ✔ | ✔ | ✔ | ✔ |
| Uint | ✔ | ✔ | ✔ | ✔ | ✔ | ✔ | ✔ |
| Long | ✔ | ✔ | ✔ | ✔ | ✔ | ✔ | ✔ |
| Ulong | ✔ | ✔ | ✔ | ✔ | ✔ | ✔ | ✔ |
| String | ✗ | ✗ | ✗ | ✗ | ✗ | ✗ | ✗ |
| Float | ✗ | ✗ | ✗ | ✗ | ✗ | ✗ | ✗ |
| Double | ✗ | ✗ | ✗ | ✗ | ✗ | ✗ | ✗ |
| IPv4 | ✗ | ✗ | ✗ | ✗ | ✗ | ✗ | ✗ |
| IPv4Net | ✗ | ✗ | ✗ | ✗ | ✗ | ✗ | ✗ |
| IPv4Range | ✗ | ✗ | ✗ | ✗ | ✗ | ✗ | ✗ |
| Time | ✗ | ✗ | ✗ | ✗ | ✗ | ✗ | ✗ |
| TimeRange | ✗ | ✗ | ✗ | ✗ | ✗ | ✗ | ✗ |

SYSTEM, METHOD AND COMPUTER PROGRAM PRODUCT FOR READING, CORRELATING, PROCESSING, CATEGORIZING AND AGGREGATING EVENTS OF ANY TYPE

RELATED APPLICATION(S)

The present application claims the priority date of a provisional application entitled "HIGHLY RELIABLE AND SCALEABLE SYSTEM FOR READING, CORRELATING, PROCESSING, CATEGORIZING AND AGGREGATING EVENTS OF ANY TYPE AT VERY HIGH SPEEDS" and filed Jun. 12, 2000 under Ser. No. 60/211,029, and which is incorporated herein by reference in its entirety.

FIELD OF THE INVENTION

The present invention relates to network accounting, and more particularly to collecting and processing network accounting information.

BACKGROUND OF THE INVENTION

As Internet Service Providers (ISPs) continue to differentiate themselves by providing additional services, enterprise information technology managers face similar problems in accounting for the escalating Internet operating costs. Therefore, ISPs and enterprise information technology managers want to account for session logging, bandwidth usage, directory data and application session information from a variety of sources.

Due to the diversity of IP data sources (e.g. routers, hubs, etc.), the need for effect tracking far exceeds the problems addressed by telephone companies. Telephone companies track information such as circuit usage so it can be correlated with account information. For example, businesses may use leased lines, consumers may have "Friends and Family" plans, cellular users have different roaming charges according to the location of the user, etc. Typically, the phone company captures all of the data and uses batch processing to aggregate the information into specific user accounts. For example, all the long distance calls made during a billing period are typically correlated with the Friends and Family list for each phone account at the end of a billing period for that account. This requires a significant amount of computing power. However, this type of problem is significantly simpler than attempting to track and bill for every transaction in an IP network. Therefore, what is desired is a system that allows for accounting and billing of transactions on IP based networks.

The problem is even more difficult in an IP network because many information sources can exist at many different levels of the OSI network model, throughout heterogeneous networks. Potential sources of information include packets generated by routers, firewall authentication logging, email data, ISP session logging, and application layer use information.

One proposed solution is described in PCT application WO9927556A2 entitled "NETWORK ACCOUNTING AND BILLING SYSTEM AND METHOD" and published Jun. 3, 1999. Such system includes gatherer devices that gather detailed information from various information source devices and convert the information into standardized information. The gatherer devices can correlate the gathered information with account information for network transaction accounting. Manager devices manage the gatherer devices and store the gathered standardized information. The manager devices eliminate duplicate network information that may exist in the standardized information. The manager devices also consolidate the information. Importantly, the information stored by the manager devices represents the consolidated, account correlated, network transaction information that can be used for billing or network accounting. The system thereby provides a distributed network accounting and billing system.

While the foregoing system is effective, it lacks efficiency since it may treat information from different data input sources in a similar manner. This often results in a reduction in overall system speed and performance. There is therefore a need for a technique of dealing with information from different data input sources in a more tailored, dynamic and efficient manner in order to effect improvements in system speed and performance.

DISCLOSURE OF THE INVENTION

A system, method and computer program product are provided for handling network accounting information. Initially, records indicative of network events are received from an input source. Next, action events are selected based on the input source. Such selected action events are then executed on the records for reading, correlating, processing, categorizing, and/or aggregating network accounting information associated with the records.

The present invention thus acts as an efficient, fast correlator and aggregator. It is meant to handle a very high flow of input records by performing the entire correlation and aggregation stages inside one module, using a specialized language and compiler process.

In one embodiment of the present invention, the action events may include computer code for executing a process involving the records. Further, the computer code may be compiled prior to the execution thereof. In order to accelerate processing, multiple action events may be executed in parallel.

In another embodiment of the present invention, data associated with the records may be stored in a table. Such table may include a plurality of rows each containing a plurality of columns each including data of a different type. Optionally, the data of each of the rows may expire after a predetermined time period. Upon the expiration of the data, an action event may be executed to determine whether the data of each of the rows is deleted.

In one specific embodiment of the present invention, a method is provided for handling network accounting information of any type, including: reading configuration data which defines a table by specifying at least one field identifier and a timeout type and period, the configuration data further defining a plurality of input sources by specifying at least one parameter for each input source, the configuration data further defining a plurality of action events by specifying code capable of executing each action event; creating the table defined by the field identifier of the configuration data; initializing the input sources; loading event handlers with the code included with the configuration data; receiving records indicative of network events from the initialized input sources; storing the records in the table; selecting action events based on the input source associated with the received records; executing the selected action events on the records utilizing the event handlers; and deleting the records upon expiring in accordance with the timeout type and period of the configuration data; wherein at least one of the action events is executed to determine whether the data of each of the rows is deleted upon expiring. The execution of the selected action events includes: discarding records stored during the execution of previous action events, parsing the configuration data associated with the selected action events, and utilizing the parsed configuration data to repeat the initialization operations.

BRIEF DESCRIPTION OF THE DRAWINGS

FIG. 5 shows a table that summarizes the allowed comparison operators for each data type.

DESCRIPTION OF THE PREFERRED EMBODIMENTS

Figure 1:
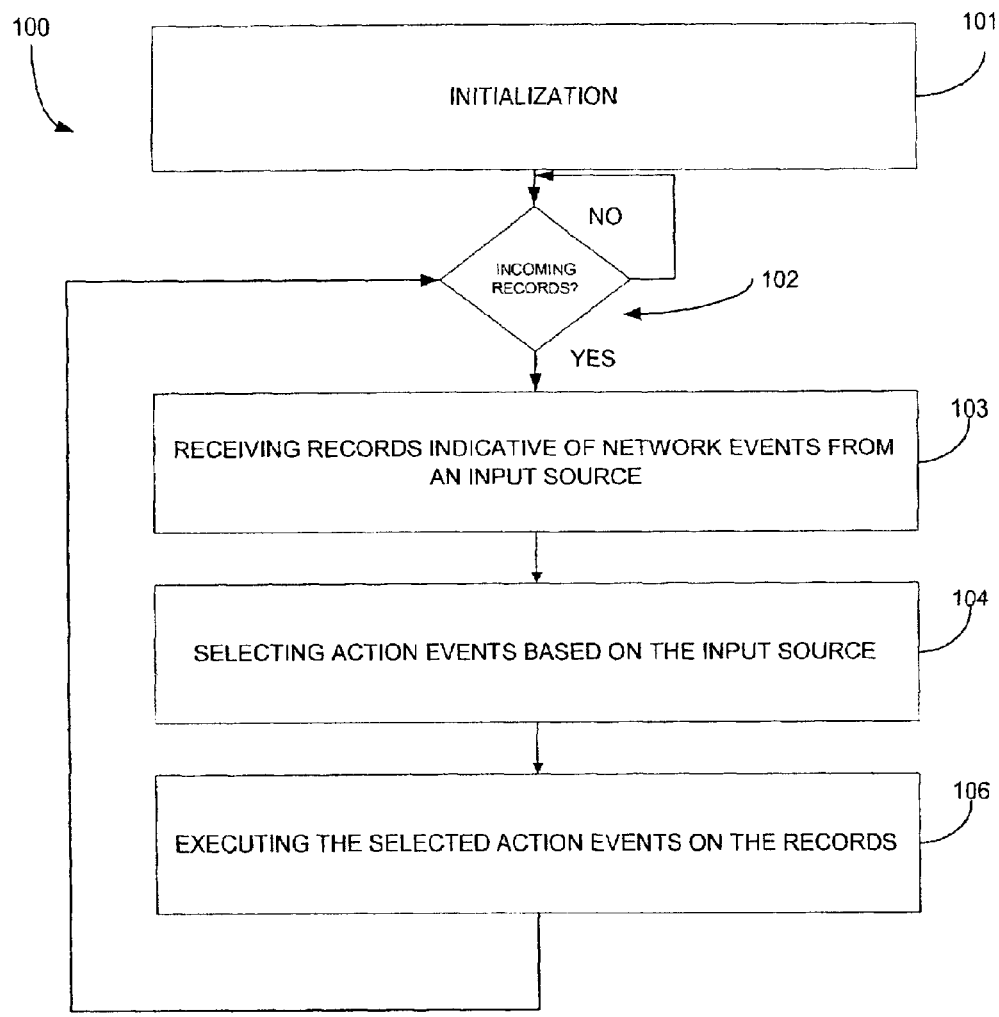
FIG. 1 illustrates a method for handling network accounting information.

FIG. 1 illustrates a method 100 for handling network accounting information. Examples of such network accounting information may include, but are not limited to a session's source, destination, user name, duration, time, date, type of server, volume of data transferred, etc. It should be noted that the network accounting information may be handled for any reason including, but not limited to usage metering, reading, tracking, correlating, aggregating, or any other process associated with the network accounting information.

Initially, in operation 101, an initialization procedure is executed for preparing the present invention for the receipt of records. Additional information regarding the initialization operation 101 will be set forth in greater detail during reference to FIG. 2. Thereafter, in decision 102, the receipt of records is monitored.

Upon incoming records being detected, such records are received from an input source. Note operation 103. Next, in operation 104, action events are selected based on the input source. As an option, the action events may include computer code for executing a process using the records. Further, the computer code may be compiled prior to the execution thereof.

In operation 106, such selected action events are then executed on the records for usage metering, reading, tracking, correlating, aggregating, or any other process associated with the network accounting information. In order to accelerate processing, multiple action events may be executed in parallel. Additional information regarding the execution of action events will be set forth in greater detail during reference to FIG. 3.

It should be understood that the initialization procedure and configuration data structure permit the creation of the tables in which the records are stored, initialization of the input sources from which the records are received, and defining of action events. The initialization procedure and configuration data structure thus enable the present invention to specifically tailor the computer code of the action events as a function of a particular "type" of the input source. As such, the present invention effectively accommodates a variety of received records. Resulting is a correlator and aggregator system that is efficient and fast.

Figure 2:
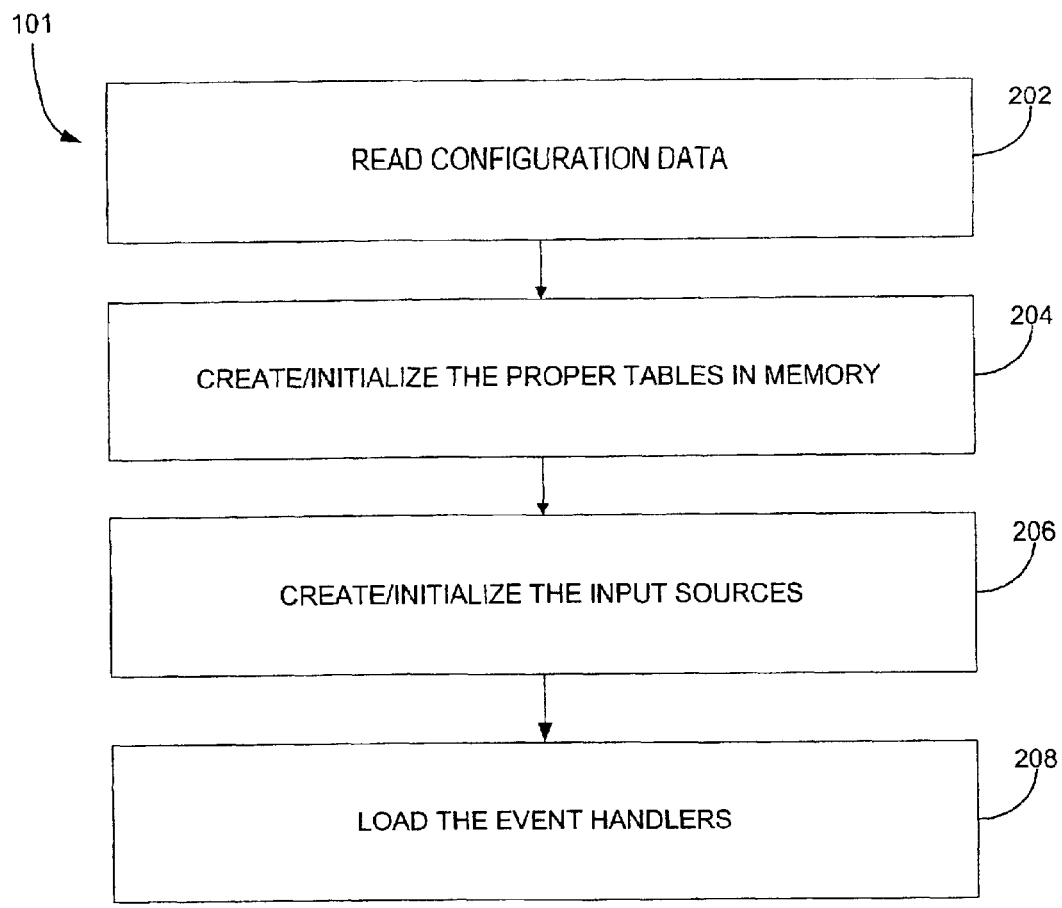
FIG. 2 illustrates a flowchart setting forth additional information regarding the initialization operation of FIG. 1.

FIG. 2 illustrates a flowchart setting forth additional information regarding the initialization operation 101 of FIG. 1. As shown, initialization begins by reading configuration data, as indicated in operation 202. Additional information regarding the initialization procedure 101 and configuration data structure will be set forth hereinafter during reference to the section entitled "Configuration File."

Next, in operation 204, proper tables are created and/or initialized in memory utilizing the configuration data. As will soon become apparent, data associated with the records may be stored in such tables. Such tables may include a plurality of rows each containing a plurality of columns each including data of a different type. Optionally, the data of each of the rows may expire after a predetermined time period. Upon the expiration of the data, an action event may be executed to determine whether the data of each of the rows is deleted.

In operation 206, the input sources may be created and/or initialized utilizing the configuration data for receiving the records therefrom. Subsequently, event handlers may be loaded utilizing the configuration data for dealing with records when received. Note operation 208.

Figure 3:
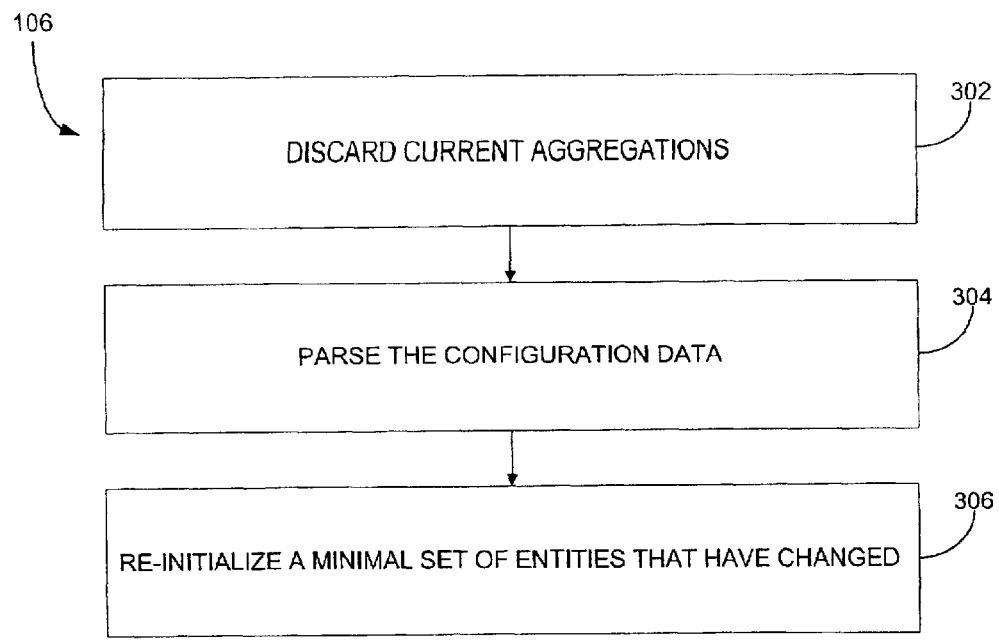
FIG. 3 shows a flowchart setting forth additional information regarding the execution of the selected action events set forth in FIG. 1.

FIG. 3 illustrates a flowchart setting forth additional information regarding the execution of the selected action events in operation 106 of FIG. 1. As shown, any current results, i.e. aggregations, of previous processing are discarded, or flushed. Note operation 302. Next, configuration data associated with the selected action event(s) is parsed, as set forth in operation 304.

Based on the parsing in operation 304, the minimal set of entities that have changed are re-initialized. See operation 306. As will soon become apparent, such entities may refer to a table, input source, and/or an action event (as defined by the configuration data). Further, the re-initialization process of operation 306 may be similar to operation 101 of FIG. 1 which is described in detail during reference to FIG. 2.

Figure 3A:
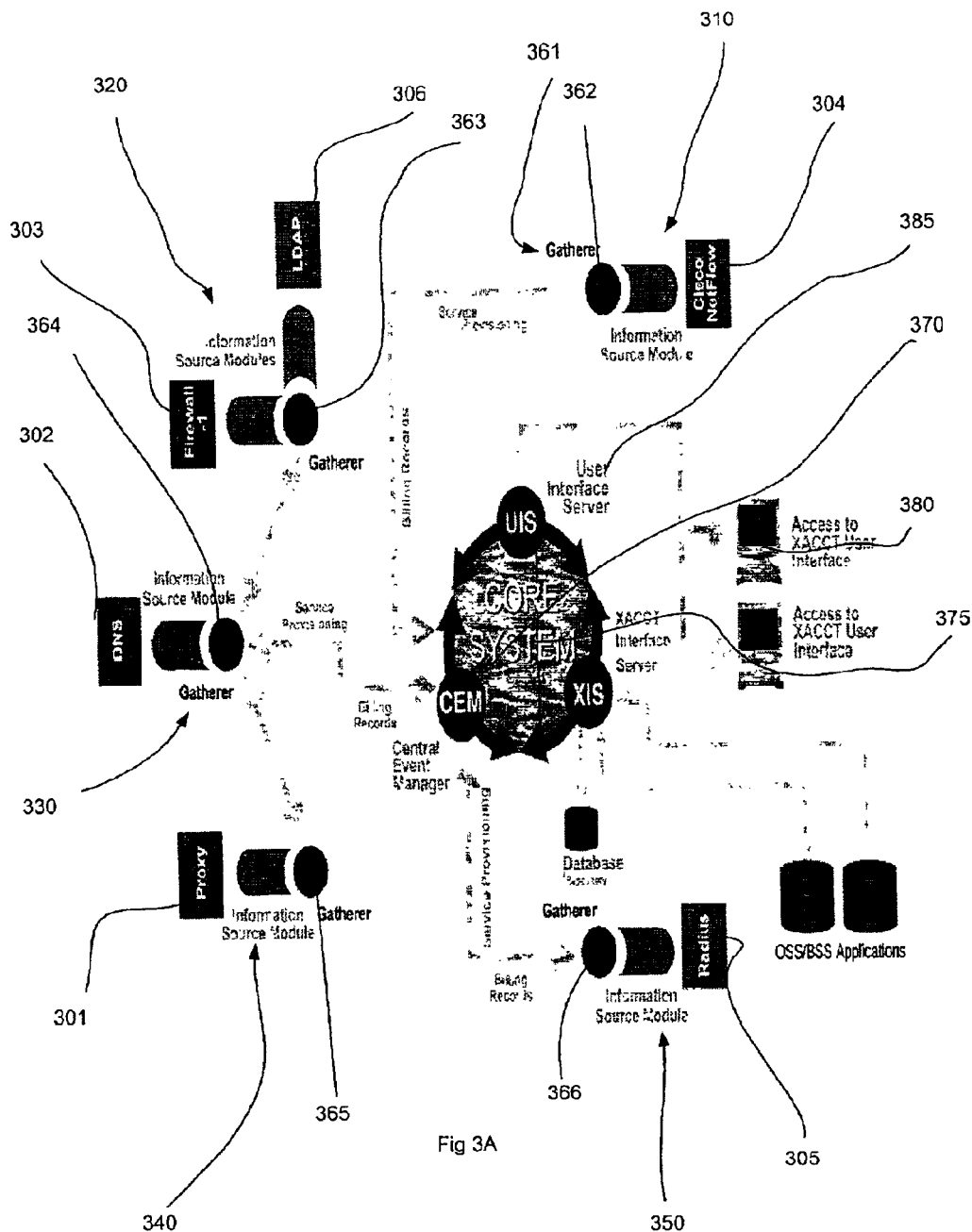
FIG. 3A illustrates an exemplary environment in which the present invention may be implemented.

FIG. 3A illustrates an exemplary environment in which the present invention may be implemented. It should be noted that the present invention may be implemented in any desired system environment, and the system of FIG. 3A is presented for illustrative purposes. As shown, a number of information source modules (ISMs) are provided including an ISM 310, an ISM 320, an ISM 330, an ISM 340, and an ISM 350.

The system further includes a number of network devices, such as a proxy server 301, a domain name server (DNS) 302, a firewall 303, an LDAP 306, a CISCO Netflow 304, and a radius server 305. The system also includes a number of gatherers 361 including a gatherer 362, a gatherer 363, a gatherer 364, a gatherer 365, and a gatherer 366. The system of FIG. 3A also includes a central event manager (CEM) 370 and a central database 375. The system also includes a user interface server 385 and a number of terminals or clients 380. Such system components are coupled, as shown in FIG. 3A.

In use, the various ISMs 310 may gather records by way of the gatherers 361 in a manner that is well known to those of ordinary skill. Upon gathering such records, the CEM 370 may process the information in accordance with FIGS. 1–3. For further information on possible workings of the various components of FIG. 3A, reference may be made to PCT application WO9927556A2 entitled "NETWORK ACCOUNTING AND BILLING SYSTEM AND METHOD" published Jun. 3, 1999, which is incorporated herein by reference in its entirety.

In one embodiment, the foregoing exemplary system may employ an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. One preferred embodiment may be written using JAVA, C, and/or C++ language, or other programming languages, along with an object oriented programming methodology. Object oriented programming (OOP) has become increasingly used to develop complex applications.

Additional information will now be set forth regarding a specific exemplary implementation, i.e. configuration, of the present invention. In one embodiment, the present invention defines a plurality of entities. Table 1 sets forth such entities.

TABLE 1

| | |
|---|---|
| Table | A Table is an entity used by the present invention to store and aggregate data. |
| | A Table can be thought of as a collection of rows, each containing a set of predefined columns, each column of a different type. |
| | Rows always expire after a predefined period of time, at which point an event function is called in order to possibly delete them and output their content. |
| Input Source | An input source is a data source, which the present invention listens to. |
| | An input source provides a flow of input records, which may be dealt within the present invention. |
| | The arrival of input records usually triggers a set of events defined in he present invention. |
| Event | An event is defined as user code, which is invoked upon a certain condition. |
| | For example, events are invoked when the system receives an input record to process or when a table row expires. |

Since one of the capabilities of the present invention is to handle very fast flows of input records, various steps may be taken in order to improve performance. For example, the present invention may make use of different threads to process the events. This allows for different input records to be processed in parallel fashion when run on an SMP (Symmetrical Multi Processing) Machine.

The present invention may take the configuration data passed to it, and compile it using a C++ compiler and a set of classes into an object, which performs the requested operations and uses that object dynamically, re-creating the C++ code and recompiling it whenever a configuration change occurs. In this way, the code created to handle the aggregation requested by the user is compiled specifically per that configuration/aggregation. This has the capability of really speeding things up.

Configuration File

The present invention is set up using configuration data, which may be written in the XML format. The XML configuration data is composed of a XML header, a TABLES section, an INPUT section, and an EVENTS section. Example 1 illustrates exemplary configuration data.

EXAMPLE 1

```
<!-- Here is a XML comment -->
<!-- This is the XML header -->
<!-- The Tables section -->
<Tables>
...
</Tables>
<!-- The Inputs section -->
<Inputs>
...
</Inputs>
    <!-- The Events section -->
<Events>
...
</Events>
```

Tables Section

The tables section in the configuration file defines different tables used later in the system to store and aggregate information. The tables are defined between the opening <Tables> and closing </Tables> XML tags. It should be noted that one or more tables may be defined. A single table is defined between the opening <Table> and closing </Table> XML tags. Table 2 illustrates the various attributes of a table object, which can be set by the user, at the opening tag.

TABLE 2

| Attribute Name | Default Value | Description |
|---|---|---|
| Name | None | This attribute refers to the identifier name given to the table. Note that this identifier may be unique throughout the configuration file. |
| Poolsize | 512 | This attribute refers to the amount of data that may be pre-allocated for the table. Tweaking this value can yield with performance boost. When the number of entries expected to populate the table is relatively large (many entries), the pool size may be set to a large number. When the number of entries expected to populate the table is relatively small (few entries), the pool size may be set to a small number. |
| Flush-Handlers | None | This attribute refers to the event handlers that are called before a flush operation. The value for this attribute is a comma-separated list of event names. The event handlers may be executed when the system decides that the record has to be flushed. The specified event is expected to make any last calculations needed on the row, so that the system can continue to flush it. It should be noted that the event handler specified here does not necessarily perform the flush by itself, but rather the system does so. The event handler only tidies up the record before the actual flush is performed by the system. |

Fields Section

Each table is constructed from a set of fields. A table definition may contain at least one field. The fields are defined between the opening <Fields> and closing </Fields> XML tags. One or more fields may be defined. A field object defines a field in the current table being specified. Table 3 illustrates the various attributes of a field object, which can be set by the user, at the opening tag.

TABLE 3

| Attribute Name | Default Value | Description |
|---|---|---|
| Name | None | This attribute refers to the identifier name given to the field. It should be noted that this identifier may be unique throughout the table definition section. |
| Type | None | This attribute refers to the type of the field. Possible values are: |
| | | Int — An integer ($-2^{31}:2^{31}-1$) |
| | | Uint — An unsigned integer ($0:2^{32}-1$) |
| | | Long — A long integer ($-2^{63}:2^{63}-1$) |
| | | Ulong — A unsigned long integer ($0: 2^{64}-1$) |
| | | String — A variable length string |
| | | Float — A single precision floating point number. |
| | | Double — A double precision floating point number |
| | | IPv4 — An IPv4 internet address |
| | | IP — Same as IPv4 |
| | | IPv4Net — An IPv4 Network (IP + Netmask) |
| | | IPNet — Same as IPv4Net |
| | | IPv4Range — An IPv4 Address Range (IP1–IP2, no netmask boundary) |
| | | IPRange — Same as IPv4Range |
| | | Time — A time/date value |
| | | TimeRange — A Time/Date Range |
| Key | None | When this attribute is specified, it determines if the field is considered to be a key field or is it a regular field. This attribute can be either set to key=true- or- key=false. Specifying the value key without a value defaults to key=true |
| Overflow | None | When this attribute is specified, it sets the behavior of the present invention for handling fields which may overflow. The system automatically performs a flush operation according to the regular flush semantics (See FlushHandlers attribute under table attributes in Table 2) if and when a certain operation on that field (such as addition) may cause an overflow on the value of that field. |
| Comment | None | This attribute refers to a user defined free text that usually describes the field's purpose/meaning. |

Timeouts Section

The timeouts section specifies a series of timeouts that are counted for the table/records. The timeouts specified in this section are independent of each other. That is, each timeout is counted independently, and there is not necessarily a limit on the number of different timeouts that a user can set per table. The timeouts are defined between the opening <Timeouts> and closing </Timeouts> XML tags.

A timeout object specifies the properties for a single timeout object. When a timeout is exhausted, the system performs a flush operation on the record that needs to be flushed according to the regular flush semantics (See FlushHandlers attribute under table attributes in Table 2). Table 4 illustrates the attributes of a timeout object, which can be set by the user, at the opening tag.

TABLE 4

| Attribute Name | Default Value | Description |
|---|---|---|
| type | None | This attribute refers to the type of the timeout to set. There are currently three supported timeout types: |
| | | In-activity — An inactivity timeout: An inactivity timeout is kept separately for each record in the table. An inactivity timeout performs a flush only if a certain row was not updated for the specified period. |
| | | Max-imum — A maximum timeout: A maximum timeout is kept separately for each record in the table. A maximum timeout waits for the specified period and flushes the record. |
| | | Fixed-Div — A fixed divider timeout: A fixed divider timeout accepts only certain values as timeouts. These values may divide without remainder in the following time unit. (e.g.: 15 minutes in an hour is legal, while 16 minutes in an hour are illegal). A fixed divider timeout is global for all records in the table, since it is exhausted at the same instant every minute/hour/day. |
| period | None | This attribute refers to the period for the timeout to wait. This attribute is specified as a time period for which the timeout may wait according to semantics of the specific type of the timeout. A timeout expression is a number, which can be optionally followed by a time character which specifies the time units being used: |

| Time Specifier Character | Meaning |
|---|---|
| S | Time is specified in seconds |
| M | Time is specified in minutes |
| H | Time is specified in hours |
| D | Time is specified in days |

The default time unit used by the table is minutes.

Table 5 sums up the different time periods that can be set for a fixed divider timeout.

TABLE 5

| Time Unit | Possible Values |
|---|---|
| Seconds | 1,2,3,4,5,6,10,12,15,20,30,60 (All that divide in a minute) |
| Minutes | 1,2,3,4,5,6,10,12,15,20,30,60 (All that divide in an hour) |
| Hours | 1,2,3,4,6,8,12,24 (All that divide in a day) |

Example 2 illustrates an exemplary table specification. Such code snippet demonstrates a table definition using most of the mentioned attributes.

EXAMPLE 2

```
<Table name=radius poolsize=1024 flushhandlers="a,b,c">
    <Fields>
        <field    name=ip       type=IP       key    />
        <field    name=user     type=String          />
        <field    name=t        type=Time            />
        <field    name=bytes    type=Ulong           />
    </Fields>
    <Timeouts>
        <Timeout  type=inactivity   period=10M/>
        <Timeout  type=maximum      period=2H/>
    </Timeouts>
</Table>
```

Inputs Section

The inputs section defines the different input sources that are used by the present invention. The inputs section is specified within the opening <Inputs> and closing </Inputs> XML tags. Each input section is a collection of input objects.

An input object is defined within the <Inputs> section and specifies which input objects should be created and how should they be initialized. The Input object is defined between the opening <Input> and closing </Input> XML tags. Table 6 illustrates the various attributes of an input tag.

TABLE 6

| Attribute Name | Default Value | Description |
| --- | --- | --- |
| name | None | This attribute name refers to an identifier name given to the input source. It should be noted that this identifier may be unique throughout the configuration file. |
| type | None | This attribute name refers to a type of the input source. As an option, the following types may be supported:<br>NetFlow — Read CISCO NetFlow Data Export packets from a UDP port<br>SANative — Read from a Native Table Update protocol (To Be Defined Later).<br>File — Read static data from a file |
| handlers | None | This attribute name refers to handlers attributes that contain a comma-separated list of events that may be triggered whenever an input record arrives to an input source. The event handlers are triggered according to the order in which they are specified |

Params Section

Each defined input object usually has a different set of parameters and/or values that initialize them. For this purpose, the params section exists which is defined between the opening <Params> and closing </Params> sections. It should be noted that the actual parameters defined and passed to the input object are type dependant. In other words, parameters, which an input source of type NetFlow recognizes differ from the parameters, which an input source of type the present invention recognizes.

The params section may be a collection of one ore more param objects. A param object is defined in a <Param> XML Tag. Table 7 illustrates the various attributes of the param object.

TABLE 7

| Attribute Name | Default Value | Description |
| --- | --- | --- |
| Name | none | The present attribute refers to an identifier name given to the parameter. |
| value | None | The present attribute refers to a string value of the parameter. |

Example 3 illustrates exemplary input.

EXAMPLE 3

```
<Input name=nf_in type=NetFlow handlers="e1,e2">
    <Params>
        <Param    name="udpport"   value="6666"/>
        <Param    name="bufsize"   value="8192"/>
    </Params>
</Input>
```

Events Section

The events section defines actual code that may be carried out when events occur throughout the system (input records arrival, table row timeouts). The different events are defined between the opening <Events> and closing </Events> XML tag. An event object carries the definition for one single event. A single event is defined between the opening <Event> and closing </Event> XML tags. Table 8 illustrates the various attributes of an Event.

TABLE 8

| Attribute Name | Default Value | Description |
| --- | --- | --- |
| Name | None | The present attributes refers to an identifier name given to the event. It should be noted that the identifier may be unique for the entire configuration file. |

Each event object contains a code section. The code section in an event specifies the code that is executed by the present invention whenever an event is triggered (input record arrival, table row timeout). The code section is specified between the opening <code> and closing </code> XML tags. Example 4 illustrates an event object example.

EXAMPLE 4

```
<Event name=r>
    <code>
        radius [radius_in.ip] .user = radius_in.user;
        radius [radius_in.ip] .t = time();
    </code>
</Event>
```

Example 4 shows the event handler called "r". Although it cannot be determined from this example, a radius input object triggers this event handler. This event handler goes to the radius table at the index of the IP. If that row/record does not exist, a new row is created. After getting the row, it turns to the user member of the radius table (according to the previous definition) and sets it with the user that was passed in the input record.

Writing Code

The present invention provides a language through which a user can create very elaborate rules for aggregation, enhancement, correlation etc. The language that is used may be C++. Certain C++ classes are provided so that the user may be able to write relatively simple code, which performs the above tasks efficiently.

Datatypes

The code written for the system manipulates fields in input rows or aggregation tables. Each field has its own distinct data type that allows different actions to be performed with it. Every data type also supports a set of operators that can be used to manipulate the field. For example: "A=B+50;" makes use of two operators: the assignment ("="), and the plus ("+") operator. Most operators are intuitive, and follow the regular operator semantics which is defined by C++.

Figure 4:
FIG. 4 illustrates a complete list of supported operators in accordance with one embodiment of the present invention.
Figure 6:
FIG. 6 is a table that summarizes the allowed bitwise operators for each data type.

FIG. 4 illustrates a complete list 400 of supported operators. The list 400 summarizes the allowed "mathematical" operations for each data type. FIG. 5 shows a table 500 that summarizes the allowed comparison operators for each data type. FIG. 6 illustrates a table 600 that summarizes the allowed bitwise operators for each data type.

Initialization of Special Types

Some of the types supported by the system are non-trivial, such as IPv4, IPv4Net, and so on. The initialization of such types may be conducted in a special manner.

Regarding the initialization of an IPv4/IP field, an IPv4/IP object type can be set/initialized by either one of two ways.

When copying an existing IPv4 object, the user can simply use an assignment operator ("="). In the alternative, when initializing an IPv4 object, the user can specify the IP as a string. Example 5 illustrates the two possible ways of initialization of an IPv4/IP field.

EXAMPLE 5

```
// The first way
Table.IPfield = OtherTable.IpNetfield;
//The second way
Table.IPField = IP("212.105.34.11", "255.255.255.255");
```

With respect to initializing an IPv4Net/IPNet field, it should be noted that an IPv4Net/IPNet field is an IP/Netmask pair, as is used in normal IP terminology. A user wishing to set an IPv4Net object can do so in the following ways:

The user can simply use an assignment operator ("=").

The user can specify the IPv4Net as a pair of strings.

The user can specify the IPv4Net as a pair of IPv4 objects.

The user can specify the IPv4Net as a String & Number (representing the netmask) tuple.

The user can specify the IPv4Net as a IPv4 & Number (representing the netmask) tuple.

Example 6 illustrates the various possible ways of initialization of an IPv4Net/IPNet field.

EXAMPLE 6

```
// The first way
Table.IPNetField = OtherTable.Ipfield;
// The second way
Table.IPNetField = IPv4Net("212.105.34.11", "255.255.255.0");
// The third way
IP1 = IPv4("212.105.34.11");
IP2 = IPv4("255.255.255.0");
Table.IPNetField = IPv4Net(IP1, IP2);
// The fourth way
Table.IPNetField = IPv4Net("212.105.34.11", 23);
// The fifth way
IP = IPv4("212.105.34.11");
Table.IPNetField = IPv4Net(IP1, 26);
```

When initializing an IPv4Range/IPRange field, it should be noted that an IPv4Ranget field is an pair of IPv4 fields as is used in DHCP configuration etc. A user wishing to set an IPv4Net object can do so in any of the following ways:

The user can simply use an assignment operator ("=").

The user can specify the IPv4Net as a pair of strings representing the two IP fields.

The user can specify the IPv4Net as a pair of IPv4 objects. Note Example 7.

EXAMPLE 7

```
// The first way
Table.IPNetField = OtherTable.Ipfield;
// The second way
Table.IPNetField = IPv4Net("212.105.34.11", "212.105.36.21");
// The third way
IP1 = IPv4("212.105.34.11");
IP2 = IPv4("212.105.36.21");
Table.IPNetField = IPv4Net(IP1, IP2);
```

Objects

When user code does not manipulate the fields, the different data types presented by the system usually perform different operations on objects. The objects provided by the system are not standard in C++, therefore an elaborate description of each object may be provided so that proficient code may be written. The two types of objects the user has access to in the code segments are input sources and aggregation tables.

When writing code segments, input sources can be considered as deprecated tables containing only one row, which is the current input record that needs to be handled. Input sources contain the different fields that the input source defines. Table 9 illustrates the fields defined in the case of a radius input.

TABLE 9

| Field Name | Type | Description |
| --- | --- | --- |
| ip | IP | The IP of the radius operation. |
| op | String | The operation which the radius server performed (START/STOP). |
| User | String | The user who is associated with this IP. |

The user can access the fields in the input object using the "." operator. For example, "i.user" accesses the user field (of type string) in the input object.

Table objects, unlike the input sources, are more complex. Tables hold a collection of rows, each of which has a constant structure, which is defined in the foregoing "tables section." Tables have a lookup operator, denoted with "[ ]", which allows the user to access the table according to the key(s) defined for the table. The lookup operator returns a reference to a row of the predefined form, which can be used much like the input record object. It should be noted that the number of parameters passed in the [ ] operation depends on the number of fields defined as keys in the tables section. Example 8 illustrates this.

EXAMPLE 8

```
<Table name=t1>
        <Fields>
        <Field name=k1 type=integer    key/>
        <Field name=k2 type=string     key/>
        <Field name=f1 type=time       key/>
        . . .
    </Fields>
    . . .
</Table>
. . .
<Event name=e1>
        <Code>
    t1[5, "blah"].f1 = time();
    . . .
    </Code>
</Event>
```

In Example 8, the table t1, is accessed using the keys k1, k2. The data types for each of such keys is defined independently (integer/string). When a certain statement in the code section needs to access those fields, it accesses the table using two values for the key fields. The first is an integer (5) and the second, a string ("blah").

It should be noted that the [ ] operator always returns a valid row that the user can manipulate. If a row with that key does not already exist, a new row may be created, and that valid row may be returned. Apart from the [ ] operator, tables provide a few additional methods that can used to manipulate them. See Table 10.

TABLE 10

| Name | Example | Description |
|---|---|---|
| delete | Radius.delete ("192.168.3.1") | Deletes a record which matches the key specification. Note again, that the number of parameters which delete accepts varies according to the key defintion of the table. |
| search | Radius.search ("192.168.3.1") | Return true if a row which matchs the key is found, return false if not. |
| flush | Radius.flush ("192.168.3.1") | Flushes the specified row out of the present invention using the output system. |

Example 9 illustrates an exemplary configuration file.

EXAMPLE 9

```
<!-- This is an example of a Configuratio File -->
<!—Copyright, TM, (C), Whatever -->
<!-- Define the -->
<Tables>
<!-- The Radius User/IP Mapping Table -->
    <Table Name="radius" Poolsize="1024" flushhandlers="a">
        <Fields>
            <Field    Name="ip"       Type="IP"    key="1"/>
            <Field    Name="user"     Type="String"        />
        </Fields>
        <Timeouts>
            <Timeout  Type="inactivity"  Period="10M"/>
            <Timeout  Type="maximum"     Period="2H"/>
        </Timeouts>
    </Table>
    <!-- The Ldap User/Contract Mapping Table -->
<Table Name="ldap" Poolsize="1024" flushhandlers="b">
    <Fields>
        <field    Name="user"      Type="string"   key="1"/>
        <field    Name="contract"  Type=string/>
    </Field>
    <Timeouts>
        <Timeout  Type="inactivity"  Period="10M"/>
        <Timeout  Type="maximum"     Period="2H"/>
    </Timeouts>
</Table>
    <!-- The Main Aggregation Table -->
    <!-- Collects User/Bytes/Time tuples -->
<Table Name="agg"  Poolsize="256"    FlushHandlers="">
    <Fields>
        <Field   Name="user"   Type="String"   key=/>
        <Field   Name="bytes"  Type="Ulong"/>
        <Field   Name="time"   Type="Time"/>
    </Fields>
    <Timeouts>
        <Timeout  Type="inactivity"  Period="10M"/>
        <Timeout  Type="maximum"     Period="2H"/>
    </Timeouts>
</Table>
</Tables>
<!-- The Inputs section -->
<Inputs>
    <Input name="nf_in" type="NetFlow5" handlers="nf_ev">
        <Params>
            <Param   name="udpport"   value="6666"/>
            <Param   name="bufsize"   value="8192"/>
        </Params>
    </Input>
        <Input name=radius_in type=SANative handlers="radius_ev">
            <Params>
```

```
                <Param     name="port" value="9000"/>
            </Params>
        </Input>
            <Input name=ldap_in type="SANative" handlers="ldap_ev">
                <Params>
                <Param     name="port" value="9001"/>
                </Params>
        </Input>
    </Inputs>
    <!-- The Events section -->
    <Events>
        <Event name=radius_ev>
            <Code>
                        // Delete onl when told to. . .
                        if (radius_in.op == "DELETE") {
                            radius.delete(radius_in.ip);
                            return;
                        }
                        // Otherwise, update/insert the user
                        radius[radius_in.ip] = radius_in.user;
            </Code>
        </Event>
        <Event name=ldap_ev>
            <Code>
                ldap[ldap_in.user] = ldap_in.contract;
            </Code>
        </Event>
        <Event name="nf_ev">
            <Code>
                agg[radius[nf_in.src].user].bytes +=
nf_in.dOctets;
                agg[radius[nf_in.src].user].time +=
                                    nf_in.Last - nt_in.First;
            </Code>
        </Event>
    </Events>
```

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling network accounting information, comprising:

(a) receiving records indicative of network events from an input source:

(b) storing data associated with the records in a table, wherein the table includes a plurality of rows each containing a plurality of columns each including data of a different type, the data of each of the rows expiring after a predetermined time period;

(c) selecting action events based on the input source; and (d) executing the selected action events on the records;

(e) wherein at least one of the action events is executed to delete the data of each of the rows upon expiring;

(f) wherein multiple action events are executed in parallel;

(g) wherein the action events operate on the network accounting information and are selected from the group consisting of usage metering, reading, tracking, correlating, and aggregating;

(h) wherein the execution of the selected action events includes: discarding records stored dunng the execution of previous action events, parsing configuration data associated with the selected action events, and utilizing the parsed configuration data to repeat at least one of operations (a)–(d);

(i) wherein a configuration event defines a plurality of action events by specifying code capable executing each action event.

2. The method as recited in claim 1, wherein the network accounting information Includes a session source, destination, user name, duration, time, date, type of server, and volume of data transferred.

3. The method as recited in claim 1, wherein an initialization event is executed fir preparing for the receipt of the records.

4. The method as recited in claim 3, wherein the initialization event includes reading the configuration data, creating tables, and creating input sources.

5. The method as recited in claim 4, wherein creating the input sources utilizes the configuration data.

6. A method for handling network accounting information of any type, comprising:

(a) reading configuration data which defines a table by specifying at least one field identifier and a timeout type and period, the configuration data further defining a plurality of input sources by specifying at least one parameter for each input source, the configuration data further defining a plurality of action events by specifying code capable of executing each action event;

(b) creating the table defined by the field identifier of the configuration data;

(c) initializing the input sources;

(d) receiving records indicative of network events from the initialized input sources;

(e) storing the records in the table;

(f) selecting action events based on the input source associated with the received records;

(g) executing the selected action events on the records utilizing event handlers; and (h) deleting the records upon expiring in accordance with the timeout type and period of the configuration data;

(i) wherein at least one of the action events is executed to determine whether the data of each of the rows is deleted upon expiring;

(j) wherein multiple action events are executed in parallel;

(k) wherein the action events operate on the network accounting information and are selected from the group consisting of usage metering, reading, tracking, correlating, and aggregating;

(l) wherein the execution of the selected action events includes: discarding records stored during the execution of previous action events, parsing configuration data associated with the selected action events, and utilizing the parsed configuration data to repeat at least one of operations (a)–(h);

(m) wherein a configuration event defines a plurality of action events by specifying code capable of executing each action event.

7. The method as recited in claim 6, wherein the configuration data is written in an XML format.

8. The method as recited in claim 6, wherein the configuration data includes an XML header, a tables section, an input section, and an events section.

9. The method as recited in claim 8, wherein the tables section includes a name attribute, a poolsize attribute, and a flushhandlers attribute.

10. The method as recited in claim 8, wherein the input section includes a name attribute, a type attribute, and a handlers attribute.

11. The method as recited in claim 10, wherein the handlers attribute contains a list of events that are triggered when each record arrives at the input source.

12. The method as recited in claim 8, wherein the events section includes a name attribute.

13. The method as recited in claim 6, wherein the configuration data includes a fields section.

14. The method as recited in claim 13, wherein the fields section includes a name attribute, a type attribute, a key attribute, all overflow attribute, and a comment attribute.

15. The method as recited in claim 6, wherein the configuration data includes a timeouts section.

16. The method as recited in claim 15, wherein the timeouts section includes a type attribute and a period attribute.

17. The method as recited in claim 6, wherein the configuration data includes a params section.

18. The method as recited in claim 17, wherein the params section includes a name attribute and a value attribute.

19. A data structure embodied on a computer readable medium for handling network accounting information of any type, comprising:

(a) a configuration data object which defines a table by specifying at least one field identifier and a timeout type and period, the configuration data object further defining a plurality of input sources by specifying at least one parameter for each input source, the configuration data object further defining a plurality of action events by specifying code capable of executing each action event;

(b) wherein the configuration data object is adapted for being used to create the table defined by the field identifier of the configuration data object, initialize the input sources, and load event handlers with the code included with the configuration data object;

(c) wherein Multiple action events are capable of being executed in parallel;

(d) wherein the action events are capable of operating, on the network accounting information and are selected from the group consisting of usage metering, reading, tracking, correlating, and aggregating;

(e) wherein the execution of the selected action events includes: discarding records stored during the execution of previous action events and parsing configuration data associated with the selected action events;

(f) wherein a configuration event defines a plurality of action events by specifying code capable of executing each action event.

* * * * *

UNITED STATES PATENT AND TRADEMARK OFFICE
CERTIFICATE OF CORRECTION

PATENT NO. : 6,931,444 B2
APPLICATION NO. : 09/865909
DATED : August 16, 2005
INVENTOR(S) : Schweitzer Page 1 of 1

It is certified that error appears in the above-identified patent and that said Letters Patent is hereby corrected as shown below:

Col. 15, line 46, please replace "source:" with --source;--;
Col. 15, line 62, please replace "dunng" with --during--;
Col. 16, line 36, please replace "capable executing" with --capable of executing--;
Col. 16, line 39, please replace "Includes" with --includes--;
Col. 16, line 43, please replace "executed fir" with --executed for--;
Col. 17, line 42, please replace "all" with --an--;
Col. 18, line 26, please replace "Multiple" with --multiple--.

Signed and Sealed this
Seventeenth Day of May, 2011

David J. Kappos
*Director of the United States Patent and Trademark Office*